US010264083B2

(12) United States Patent
Pang

(10) Patent No.: US 10,264,083 B2
(45) Date of Patent: Apr. 16, 2019

(54) METHODS AND APPARATUSES FOR RECOMMENDING APPLICATION AND PRESENTING RECOMMENDED APPLICATIONS

(71) Applicant: BAIDU ONLINE NETWORK TECHNOLOGY (BEIJING) CO., LTD., Beijing (CN)

(72) Inventor: Kai Pang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 15/394,393

(22) Filed: Dec. 29, 2016

(65) Prior Publication Data

US 2017/0215024 A1 Jul. 27, 2017

(30) Foreign Application Priority Data

Jan. 25, 2016 (CN) .......................... 2016 1 0049213

(51) Int. Cl.
*H04W 4/60* (2018.01)
*H04L 29/08* (2006.01)
(Continued)

(52) U.S. Cl.
CPC ............ *H04L 67/22* (2013.01); *G06F 9/4451* (2013.01); *G06F 9/45558* (2013.01);
(Continued)

(58) Field of Classification Search
CPC . H04W 4/003; H04W 21/25816; H04W 4/60; G06F 17/30867
See application file for complete search history.

(56) References Cited

U.S. PATENT DOCUMENTS

2009/0298480 A1* 12/2009 Khambete ......... G06F 17/30699
455/414.1
2011/0302274 A1* 12/2011 Lee .................. H04N 21/25816
709/217
(Continued)

FOREIGN PATENT DOCUMENTS

CN 102546777 A 7/2012
CN 103929437 A 7/2014
(Continued)

OTHER PUBLICATIONS

The First Office Action for CN2016100492132 dated Apr. 18, 2017, 10 pages.

*Primary Examiner* — Myron Wyche
(74) *Attorney, Agent, or Firm* — Nixon Peabody LLP

(57) ABSTRACT

The present disclosure provides methods and apparatuses for recommending applications and presenting recommended applications, wherein the method of recommending applications in a network device comprises: obtaining a user's current scenario information from a user equipment; determining to-be-recommended applications according to the user's current scenario information and historical application usage information of one or more users; and sending relevant information of the to-be-recommended applications to the user equipment. According to one embodiment of the present disclosure, applications to currently opened will be recommended to the user more accurately, and the user's operation path will be shortened, thereby bring a better user experience.

12 Claims, 4 Drawing Sheets

(51) Int. Cl.
*H04M 1/725* (2006.01)
*G06F 9/445* (2018.01)
*G06F 9/455* (2018.01)
*G06F 8/61* (2018.01)

(52) U.S. Cl.
CPC ........ *H04L 67/34* (2013.01); *H04M 1/72522* (2013.01); *H04M 1/72569* (2013.01); *H04W 4/60* (2018.02); *G06F 8/61* (2013.01); *H04L 67/306* (2013.01)

(56) References Cited

U.S. PATENT DOCUMENTS

| | | | | |
|---|---|---|---|---|
| 2015/0178378 A1* | 6/2015 | Hellstrom | ......... | G06F 17/30867 |
| | | | | 706/14 |
| 2016/0188169 A1* | 6/2016 | Wang | .................. | G06F 3/04842 |
| | | | | 715/771 |
| 2017/0103783 A1* | 4/2017 | Paglia | .................. | G11B 27/036 |

FOREIGN PATENT DOCUMENTS

| CN | 104268248 A | 1/2015 |
|---|---|---|
| CN | 105142104 A | 12/2015 |
| CN | 105227626 A | 1/2016 |

* cited by examiner

METHODS AND APPARATUSES FOR RECOMMENDING APPLICATION AND PRESENTING RECOMMENDED APPLICATIONS

CROSS REFERENCE OF RELATED APPLICATIONS

The present application claims priority to a Chinese invention application No. 201610049213.2, filed on Jan. 25, 2016, entitled "METHODS AND APPARATUSES FOR RECOMMENDING APPLICATION AND PRESENTING RECOMMENDED APPLICATIONS", which is incorporated hereinto in its entirety by reference.

TECHNICAL FIELD

The present disclosure relates to the field of computers, and more specifically relates to a method and apparatus for recommending applications in a network device, and a method and apparatus for presenting recommended applications in a user equipment.

BACKGROUND

With the enhancement of mobile phone capacity and mobile phone processor performance, more and more applications are installed in a mobile phone. Now, mobile phones all add entries for common applications at a first screen page. However, the shortcut entries for these common applications are only shortcuts of some fixed applications, or applications recommended according to use frequency for a user. These application are sometimes not applications the use currently needs to use. For example, in the evening, the user might prefer to open a video-class application to watch a TV drama. For another example, if the user is in a restaurant, an application he/she might want to open is likely an application like group-buying or payment. Therefore, if a user scenario is considered when recommending applications to the user, applications might need to be opened will be recommended to the user more accurately, which shortens the user's operation path and brings a better experience.

SUMMARY

An objective of the present disclosure is to provide a method and apparatus for recommending applications in a network device, and a method and apparatus for presenting recommended applications in a user equipment.

According to one aspect of the present disclosure, there is provided a method for recommending applications in a network device, wherein the method comprises:
  obtaining a user's current scenario information from a user equipment;
  determining to-be-recommended applications according to the user's current scenario information and historical application usage information of one or more users; and
  sending relevant information of the to-be-recommended applications to the user equipment.

According to another aspect of the present disclosure, there is further provided a method for presenting recommended applications in a user equipment, wherein the method comprises:
  obtaining relevant information of to-be-recommended applications based on a user's current scenario information; and
  presenting the to-be-recommended applications to the user based on the relevant information of the to-be-recommended applications.

According to a further aspect of the present disclosure, there is also provided an apparatus for recommending applications in a network device, wherein the apparatus comprises:
  means for obtaining a user's current scenario information from a user equipment;
  means for determining to-be-recommended applications according to the user's current scenario information and historical application usage information of one or more users; and
  means for sending relevant information of the to-be-recommended applications to the user equipment.

According to a still further aspect of the present disclosure, there is further provided an apparatus for presenting recommended applications in a user equipment, wherein the apparatus comprises:
  means for obtaining relevant information of to-be-recommended applications based on a user's current scenario information; and
  means for presenting the to-be-recommended applications to the user based on the relevant information of the to-be-recommended applications.

According to another aspect of the present disclosure, there is further provided a computer readable non-volatile storage, configured to store computer program, when the computer program is executed by a computer, the computer is directed to:
  obtain a user's current scenario information from a user equipment;
  determine to-be-recommended applications according to the user's current scenario information and historical application usage information of the one or more users; and
  send relevant information of the to-be-recommended applications to the user equipment.

According to another aspect of the present application, there is provided a computer device, comprising:
  at least one processor; and
  a memory, configured to store computer program, when the computer program is executed by the at least one processor, the processor is directed to:
    obtain a user's current scenario information from a user equipment;
    determine to-be-recommended applications according to the user's current scenario information and historical application usage information of one or more users; and
    send relevant information of the to-be-recommended applications to the user equipment.

Compared with the prior art, the network device according to certain embodiments of the present disclosure can determine applications which are most desired to be opened currently by the user according to historical application usage information of respective users and a user's current scenario information and recommend them to the user. The user equipment according to the present disclosure can obtain the to-be-recommended applications based on the user's current scenario information and present them to the user. The method and apparatus according to the present disclosure can shorten the user's operation path and enhance user experience.

BRIEF DESCRIPTION OF THE DRAWINGS

By reading detailed depiction of the non-limitative embodiments with reference to the accompanying drawings, other features, objectives and advantages of the present disclosure will become more apparent.

Same or similar reference numerals in the accompanying drawings represent same or similar components.

DETAILED DESCRIPTION

Figure 1:
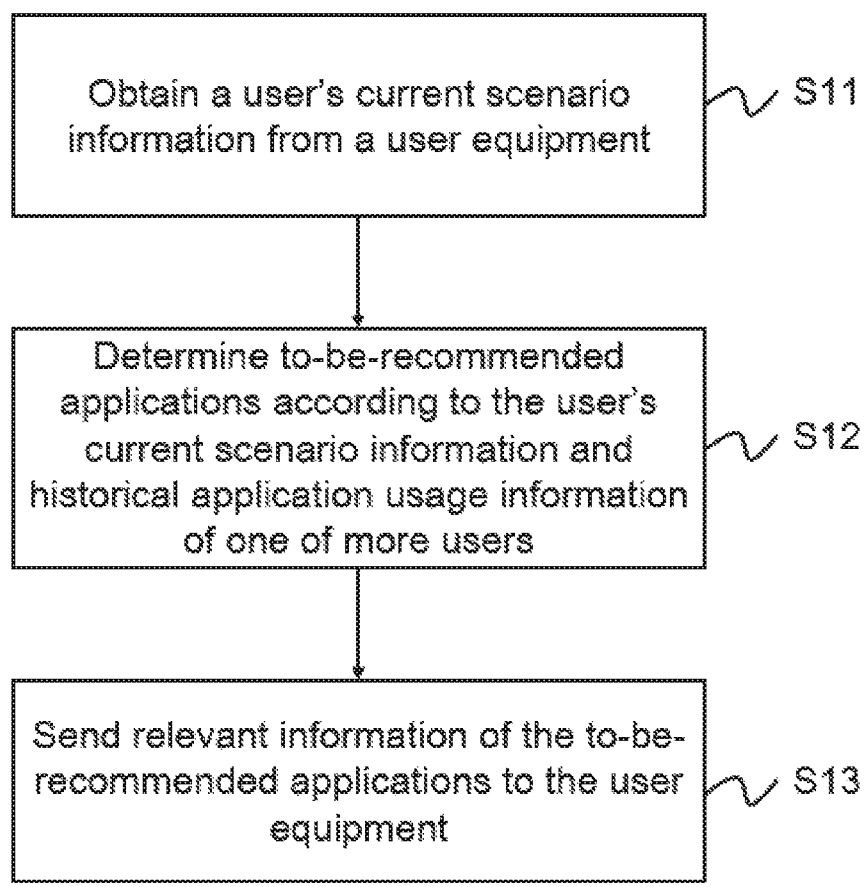
FIG. 1 illustrates a schematic flow diagram of a method for recommending applications in a network device according to an embodiment of one aspect of the present disclosure.

It should be mentioned before discussing the exemplary embodiments in more detail that some exemplary embodiments are described as a processing or method depicted as a flow diagram. Although the flow diagram depicts respective operations as being sequentially processed, many operations therein may be implemented in parallel, concurrently or simultaneously. Besides, the sequence of various operations may be rearranged. When the operations are completed, the processing may be terminated. However, there may comprise additional steps not included in the accompanying drawings. The processing may correspond to a method, a function, a specification, a sub-routine, a sub-program, etc.

The "computer device" mentioned in the context, or referred to as "computer," refers to an intelligent electronic device that may perform pre-determined processing procedures like numerical value computation and/or logical computation by executing a predetermined program or instruction, which may comprise a processor and a memory, wherein the processor executes pre-stored program instructions to perform the pre-determined processing procedure; the predetermined processing procedure may be performed by hardware such as ASIC, FPGA, and DSP, or performed by a combination of the instructions and the hardware. The computer device may include, but is not limited to, a server, a personal computer, a laptop computer, a tablet computer, a smart phone, etc.

The computer device may include a user equipment and a network device, wherein the user equipment may include, but is not limited to, a computer, a smart phone, a PDA, etc.; the network device may include, but is not limited to, a server group consisting of a single network server, a server consisting of a plurality of network servers, or a cloud consisting of mass computers or network servers based on cloud computing, wherein cloud computing may include a kind of distributed computing, which may include a super virtual computer consisting of a group of loosely coupled computer sets, wherein the computer device may independently run to implement the present disclosure, wherein the network where the computer device may be located including, but not limited to, Internet, Wide Area Network, Metropolitan Area Network, Local Area Network, VPN network, etc.

It should be noted that the user equipment, network device, and network are only examples, and other exiting or future possibly emerging computer devices or networks, if applicable to the present disclosure, should also be included within the protection scope of the present disclosure and are incorporated here by reference.

The methods discussed infra (some of which are illustrated through flow diagrams) may be implemented through hardware, software, firmware, middleware, microcode, hardware description language or any combination thereof. When they are implemented with software, firmware, middleware or microcode, the program code or code segment for executing essential tasks may be stored in a machine or a computer readable medium (e.g., storage medium). (One or more) processors may implement essential tasks.

The specific structures and function details disclosed here are only representative, for a purpose of describing the exemplary embodiments of the present disclosure. Instead, the present disclosure may be specifically implemented through many alternative embodiments. Therefore, it should not be appreciated that the present disclosure is only limited to the embodiments illustrated here.

However, it should be understood that although terms "first," "second" might be used here to describe respective units, these units should not be limited by these terms. Use of these terms is only for distinguishing one unit from another. For example, without departing from the scope of the exemplary embodiments, the first unit may be referred to as the second unit, and similarly the second unit may be referred to as the first unit. The term "and/or" used here includes any and all combinations of one or more associated items as listed.

It should be understood that when one unit is "connected" or "coupled" to a further unit, it may be directly connected or coupled to the further unit or an intermediate unit may exist. In contrast, when a unit is "directly connected" or "directly coupled" to a further unit, an intermediate unit does not exist. Other terms (e.g., "disposed between" VS. "directly disposed between," "adjacent to" VS. "immediately adjacent to," and the like) for describing a relationship between units should be interpreted in a similar manner.

The terms used here are only for describing preferred embodiments, not intended to limit exemplary embodiments. Unless otherwise indicated, singular forms "a" or "one" used here further intends to include plural forms. It should also be appreciated that the terms "comprise" and/or "include" used here prescribe existence of features, integers, steps, operations, units and/or components as stated, but do not exclude existence or addition of one or more other features, integers, steps, operations, units, components, and/or a combination thereof.

It should also be noted that in some alternative embodiments, the functions/actions as mentioned may occur in an order different from what is indicated in the drawings. For example, dependent on the functions/actions involved, two successively illustrated diagrams may be executed substantially simultaneously or in a reverse order sometimes.

Hereinafter, the present disclosure will be described in further detail.

FIG. 1 illustrates a schematic flow diagram of a method for recommending applications in a network device according to an embodiment in one aspect of the present disclosure.

Wherein, the method of the present embodiment is mainly implemented through a network device. The network device includes, but not limited to, a single network server or a plurality of network servers, or a cloud consisting of mass computers or network servers based on cloud computing, wherein cloud computing is a kind of distributed computing, which is a super virtual computer consisting of a group of loosely coupled computer sets.

It should be noted that the network device is only an example. Other existing or future possibly emerging network, if applicable to the present disclosure, should also be included within the protection scope of the present disclosure and is also incorporated here by reference.

The method according to the present embodiment comprises step S11, step S12, and step S13.

In step S11, the network device obtains a user's current scenario information from a user equipment. The user equipment includes, but not limited to, a computer, a smart phone, a PDA, and the like. It should be noted that the user equipment is only an example; other existing or future possibly emerging user equipment, if applicable to the present disclosure, should also be included within the protection scope of the present disclosure, and is incorporated here by reference.

In one embodiment, the scenario information includes at least one of the following:
time;
a place; or
an occasion.

In the present disclosure, the occasion may refer to other conditions not limited to the time and place. For example, in the office, at the office hour, and the mobile phone being set to mute, such occasion may be regarded as an office occasion or a meeting occasion; while also in the office, at an off hour, and the mobile phone being not set to mute, such occasion may be regarded as not an office or meeting occasion. For another example, within a cinema, the mobile phone being set to mute, this may be regarded as an occasion of watching a film; while also in a cinema, the mobile phone being not set to mute, this occasion may be regarded as not an occasion of watching a film.

There may be a plurality of ways for the network device to obtain the user's current scenario information from a user equipment. For example, the network may constantly and periodically communicate with the user equipment so as to obtain the user's current scenario information from the user equipment. For another example, the network device may also obtain the user's current scenario information from the user equipment after receiving a request sent by the user equipment regarding to-be-recommended applications. In one embodiment, the network device may receive a message including the user's current scenario information from the user equipment, and then may obtain the user's current scenario information based on the message including the user's current scenario information. Specifically, the user equipment may send a message including the current scenario information to the network device; the network device, after receiving the message, may extract the user's current scenario information from the message, thereby obtaining the user's current scenario information.

It should be noted that the above example is only for better illustrating the technical solution of the present disclosure, rather than limiting the present disclosure. Those skilled in the art should understand that any implementation manner of obtaining the user's current scenario information from the user equipment should be included within the scope of the present disclosure.

In step S12, the network device may determine to-be-recommended applications according to the user's current scenario information and historical application usage information of one or more users.

The historical application usage information may refer to information about a user's previous use of an application. The historical application usage information includes at least one of the following:
time of use;
a place of use;
an occasion of use;
a frequency of use.

Here, the frequency of use may refer to the number of times for the user to use the application within a unit period of time.

In the context of the present disclosure, the applications may refer to various kinds of applications used in a user equipment, e.g., Baidu search, Baidu map, Taobao, Meituan, WeChat, browser, or others.

In one embodiment, the method for recommending applications in a network device may further comprise step S14 (not shown in FIG. 1) and step S15 (not shown in FIG. 1) as follows. In step S14, the network device may obtain scenario information and application usage information of one or more users. There are also a plurality of ways for the network device to obtain the user's scenario information and application usage information. For example, the user equipment may temporarily store, in the user equipment, the user's application usage information such as the time, place, and occasion each time when the user uses the application, and the frequency of the user using the application, and send such application usage information to the network device at a fixed time of each day. As another example, the network device may periodically (e.g., every day) issue a request for sending the application usage information to the user equipment; after receiving the request for sending the application usage information from the network device, the user equipment may send local user application usage information to the network device. Those skilled in the art should understand that relevant depiction regarding obtaining scenario information of one or more users and application usage information is only exemplary, not limitative here, and various other implementation manners exist without departing from the spirit or scope of the present disclosure and are incorporated here by reference.

In step S15, the network device may establish the historical application usage information of one or more users based on the scenario information and the application usage information of one or more users. Specifically, the network device may correspondingly analyze and process such information based on the obtained scenario information and the application usage information of one or more users. The processed information may be stored as the historical application usage information of the user. For example, the network device may count and analyze the situations of the one or more users using an application in a specific scenario. For example, the network device may determine the applications that may be more commonly used by the one or more users in the meeting scenario as shorthand applications and voice recording applications through counting and analyzing the applications. For another example, the network device may derive through counting and analyzing that in a gathering scenario, 70% of the one or more users may use a WeChat application. The network device may also categorize the historical application usage information based on types of applications, such that application usage information of the same type may be merged and saved together. For example, Netease news and Baidu news belong to the same type of applications, and application usage information regarding the user's using the Netease news and Baidu news may be merged and saved together. In one embodiment, the network device may also establish a user historical application usage information database so as to save the historical application usage information of the one or more users derived from the analysis. It should be noted that the above example is only for better illustrating the technical solution of the present disclosure, not for limiting the present disclosure. Those skilled in the art should understand that any implementation manner of establishing historical application usage information of one or more users based on the scenario information and application usage information of one or more users should be included within the scope of the present disclosure.

Specifically, in step S12, the network device may determine one or more to-be-recommended applications for the user based on the derived current scenario information such as the current time, place or occasion of the user and the historical application usage information of the one or more users. For example, the network device may first obtain the user's current scenario information: the user is currently in a cinema, the time is weekend relaxing time, and the network device knows that most users in cinemas at weekends use group-buying applications and payment applications like Nuomi and Alipay based on the information regarding the applications used by a plurality of users in cinemas as recorded in the historical application usage information. The network device may match the current scenario information of the user with scenarios of respective users' application usage in the historical application usage information, and then obtain match values of respective applications. Because the match values of applications like Nuomi and Alipay are larger than a threshold value, the network device may determine that the to-be-recommended applications may be group-buying applications and payment applications like Nuomi and Alipay. As another example, the network device may know, based on the historical application usage information, that 70% of users may use social applications like WeChat when taking a subway, and then may determine that social applications such as WeChat may have a weight of 0.7 for a scenario of off duty and on the subway; the network device may know, based on the historical application usage information, that 50% users may use news applications when taking a subway, and may determine that the news applications like Netease may have a weight of 0.5 for a scenario of off duty and on the subway. When the user's current scenario information is off duty and on the subway, the network device performs matching based on the scenario information and the historical application usage information to calculate out that the sorting value of WeChat-kind applications is 0.7, and the sorting value of the Netease news-kind applications is 0.5. The network device may calculate out the sorting values of various kinds of other applications in a similar manner. The network device may compare the sorting values of respective applications with a preset threshold value. The network device may then determine applications greater than the threshold value as the to-be-recommended applications. It should be noted that the above examples are only for better illustrating the technical solution of the present disclosure, not limiting the present disclosure. Those skilled in the art should understand that any implementation manner of determining to-be-recommended applications based on the current scenario information of the user and historical application usage information of one or more users should be included within the scope of the present disclosure.

In step S13, the network device may send relevant information of the to-be-recommended applications to the user equipment.

Wherein, the relevant information of the to-be-recommended applications may include any information related to the to-be-recommended applications. In one embodiment, the relevant information of the to-be-recommended applications can be used for obtaining or directly starting their corresponding to-be-recommended applications. For example, the relevant information of a to-be-recommended application includes, but not limited to, any one or more of the following: 1) name of the application, e.g., "Baidu Cloud," "Alipay," or the like; 2) unique identification of the application, wherein the unique identification information can uniquely identify the application, including, but not limited to: an application packet name of the application, version number, picture information that may uniquely identify the application, and the like; 3) recommendation value of the application, wherein the recommendation value may indicate a recommended sorting and a recommended strength degree of the application; 4) category of the application, e.g., the Netease news is of a news-kind application, Nuomi is of a group-buying-kind application, and WeChat is of a social-kind application. It should be noted that the application information above is only an example, and those skilled in the art should understand that any information related to the application should be included within the scope of application information in the present disclosure.

Specifically, the network device may send relevant information of the recommended applications to the user equipment in a plurality of manners. The network device may periodically voluntarily send relevant information of the to-be-recommended applications to the user equipment. The network device may also first issue, to the user equipment, a request for sending the to-be-recommended applications, and after receiving a request-acknowledged message from the user equipment, the network device sends the relevant information of the to-be-recommended applications to the user equipment. In one embodiment, the network device may receive the request about the to-be-recommended applications from the user equipment and then the network device may send the relevant information of the to-be-recommended applications to the user equipment based on the request. For example, when the user is unlocking the user equipment, the user equipment voluntarily may issue a request to the network device to request the network device to send the to-be-recommended applications. After receiving the request, the network device may send relevant information such as the application names of the to-be-recommended applications of the user, the unique identifiers of the applications, the recommendation values of the applications, and the kinds of the applications, based on the user information included in the request, such as the user identifier and the like.

Figure 2:
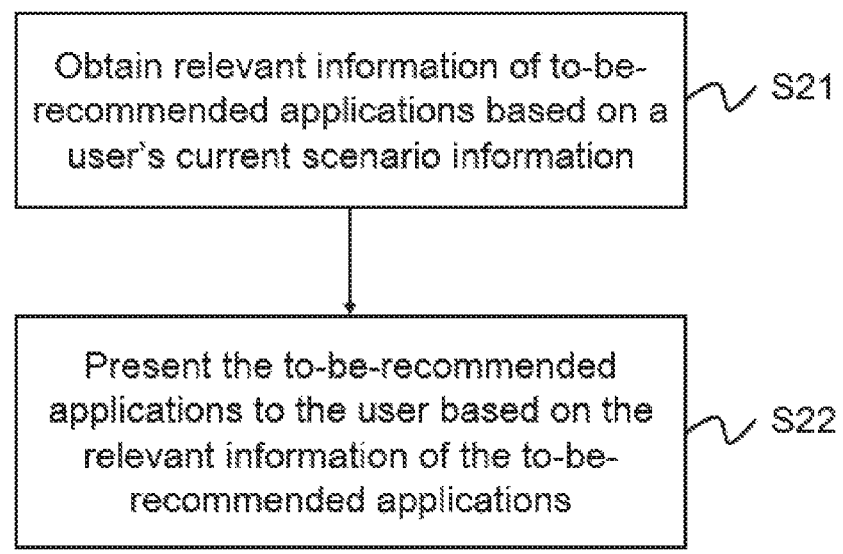
FIG. 2 illustrates a schematic flow diagram of a method for presenting recommended applications in a user equipment according to an embodiment of another aspect of the present disclosure.

FIG. 2 illustrates a schematic flow diagram of a method for presenting recommended applications in a user equipment according to an embodiment in another aspect of the present disclosure.

Wherein, the method according to the present embodiment is mainly implemented through a user equipment; the user equipment may include, but is not limited to, a PC computer, a tablet computer, a smart phone, and a PDA, etc. It should be noted that the user equipment is only an example, and other existing or future possibly emerging network devices or user equipment, if applicable to the present disclosure, should also be included within the protection scope of the present disclosure and are incorporated here by reference.

The method according to the present embodiment may comprise step S21 and step S22.

In step S21, the user equipment may obtain relevant information of to-be-recommended applications based on the user's current scenario information.

In one embodiment, the scenario information may comprise at least any one of the following:
time;
a place; or
an occasion.

In the present disclosure, the occasion may refer to other conditions not limited to the time and place. For example, in the office, at the office hour, and the mobile phone being set to mute, such occasion may be regarded as an office occasion or a meeting occasion; while also in the office, at an off hour, and the mobile phone being not set to mute, such occasion may be regarded as not an office or meeting occasion. For another example, within a cinema, the mobile phone being set to mute, this may be regarded as an occasion of watching a film; while also in a cinema, the mobile phone being not set to mute, this occasion may not be regarded as an occasion of watching a film.

Wherein, the relevant information of the to-be-recommended applications may include any information related to the to-be-recommended applications. As one example, the relevant information of the to-be-recommended applications can be used for obtaining or directly starting their corresponding to-be-recommended applications. As another example, the relevant information of a to-be-recommended application may include, but is not limited to, any one or more of the following: 1) application name of the application, e.g., "Baidu Cloud," "Alipay," and the like; 2) unique identification of the application, wherein the unique identification information can uniquely identify the application, including, but not limited to: an application packet name of the application, a version number, picture information that may uniquely identify the application, and the like; 3) recommendation value of the application, wherein the recommendation value may indicate a recommended sorting and recommended strength degree of the application; 4) category of the application, e.g., the Netease news is of a news-kind application, Nuomi is of a group-buying-kind application, and WeChat is of a social-kind application. It should be noted that the application information above is only an example, and those skilled in the art should understand any information related to the application should be included within the scope of application information in the present disclosure.

In the present disclosure, the relevant information of the to-be-recommended applications obtained by the user equipment may be based on the current scenario information of the user. The user equipment obtains the relevant information of a to-be-recommended application in a plurality of manners. In one embodiment, the user equipment may determine the relevant information of the to-be-recommended application locally based on the user's current scenario information. For example, the user equipment may compare with historical situations of the user's using respective applications based on the current place of the user, current time, and current occasion and other scenario information, determine applications relatively frequently used in the scenario as the to-be-recommended applications, and then may determine relevant information like the names and application categories of the to-be-recommended applications.

In one embodiment, the user equipment may receive relevant information of the to-be-recommended applications sent by the network device based on the user's current scenario information. The relevant information of the to-be-recommended applications sent by the network device may be based on the user's current scenario information, which may be determined according to the method described above in conjunction with FIG. 1. In one embodiment, the user equipment may first send, to the network device, a message including the current scenario information of the user, and then may receive relevant information of the to-be-recommended applications sent by the network device based on the user's current scenario information. The user equipment may receive the relevant information of the to-be-recommended applications sent by the network device in a plurality of manners, e.g., the user equipment may periodically receive the relevant information of the to-be-recommended applications from the network device. As another example, the user equipment may first receive a message from the network device which may require sending to-be-recommended applications, and then the user equipment, after replying with an acknowledgement message, may receive the relevant information of the to-be-recommended applications sent by the network device. In one embodiment, the user equipment may first send a request regarding the to-be-recommended applications to the network device, and then the user equipment may receive the relevant information of the to-be-recommended applications sent by the network device based on the user's current scenario information. For example, when the user is unlocking the user equipment, the user equipment may send a message to the network device to request the network device to send the to-be-recommended applications. Meanwhile, the user equipment may send the user's current scenario information to the network device. The network device may determine the to-be-recommended applications based on the user's current scenario information and the historical application usage information, and then the network device may send the relevant information of the to-be-recommended applications to the user equipment via a message. The user equipment may obtain the relevant information of the to-be-recommended applications by receiving the message from the network device. It should be noted that the above example is only for better illustrating the technical solution of the present disclosure, not for limiting the present disclosure. Those skilled in the art should understand that any implementing manner of receiving the relevant information of the to-be-recommended applications sent by the network device based on the user's current scenario information should be included within the scope of the present disclosure.

In step S22, the user equipment may present the to-be-recommended applications to the user based on the relevant information of the to-be-recommended applications.

The user equipment may present the to-be-recommended applications in a plurality of manners. For example, after receiving the relevant information of the to-be-recommended applications, the user equipment may directly push a shortcut carrying icons of the to-be-recommended applications to a specific location of the display screen of the user equipment to display. As another example, the user equipment may also periodically obtain the relevant information of the to-be-recommended applications and constantly present latest relevant information of the to-be-recommended applications to the user. As another example, the user may click onto a "to-be-recommended applications" button, and then the user equipment may display the icons and/or shortcuts of the to-be-recommended applications to the user. For example, when there are too many to-be-recommended applications, the user equipment may sort according to recommendation values in the information of the to-berecommended applications and display in priority several applications with maximum recommendation values.

In one embodiment, step S22 may comprise step S221 (not shown in the figure) and step S222 (not shown in the figure).

In step S221, the user equipment may check whether the to-be-recommended applications have been installed on the user equipment based on the relevant information of the to-be-recommended applications. The network device might not know which applications have been installed on the user equipment when recommending the applications, such that some of the applications recommended by the network device might have been installed, while some might not. Therefore, the user equipment may check whether the to-be-recommended applications from the network device have been installed locally and identifies those to-be-recommended applications that have not been installed in the user equipment.

In step S222, the user equipment may present the to-be-recommended applications to the user based on a result of checking. For example, the user equipment may filter applications that are not installed in the user equipment based on the result of checking and only present the installed applications. The user equipment may also present the to-be-recommended applications that are not installed locally while provide a shortcut entry for installing the to-be-recommended applications for the user to select. When filtering the applications that are not installed locally, the user equipment may also look up an application of the same kind based on the kind of the application so as to present them to the user. For example, the network device recommends the application WeChat to the user, while the user equipment does not install WeChat. The user equipment may know from relevant information of the to-be-recommended applications that the application category is of a social class; then it finds that a social-class application QQ is installed locally, thereby the user equipment may present the application QQ to the user.

Figure 3:
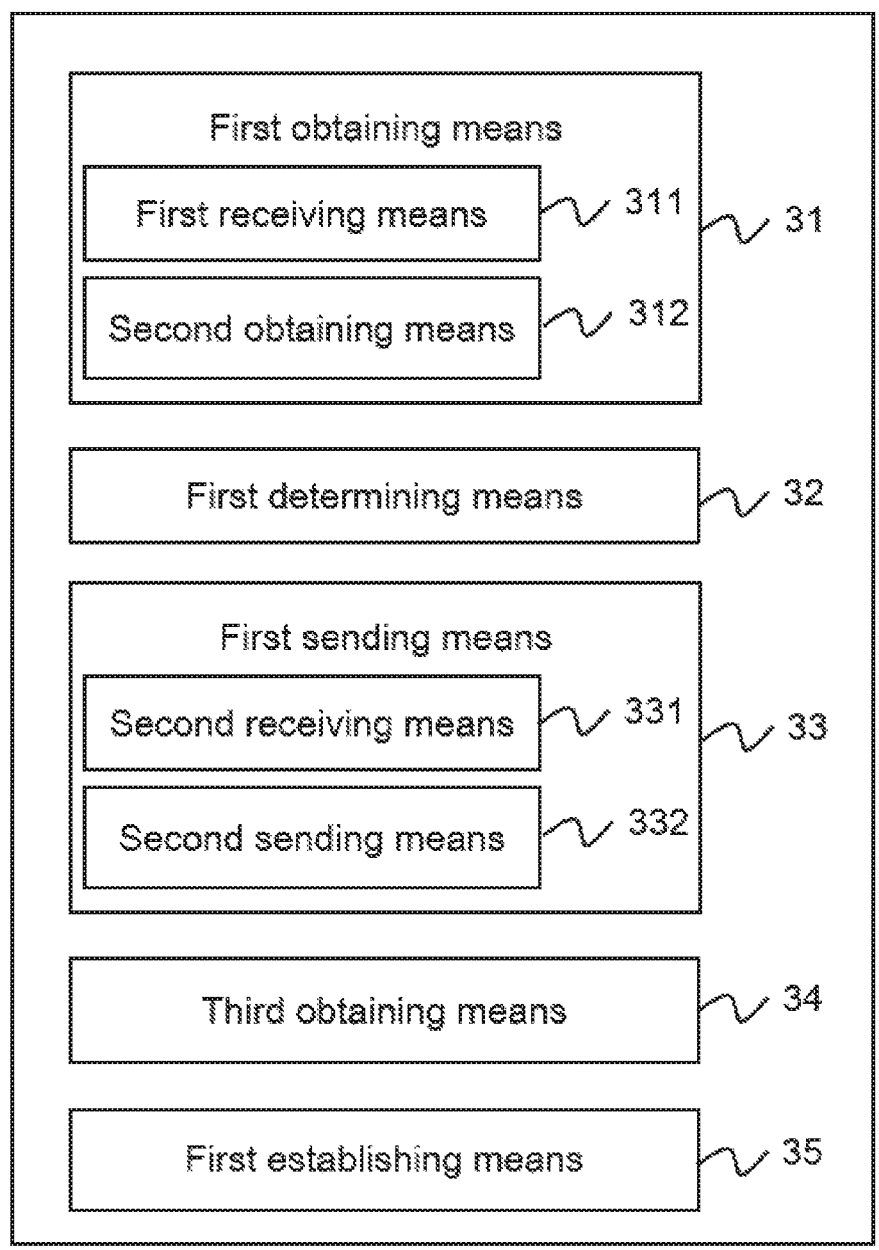
FIG. 3 illustrates a schematic diagram of an apparatus for recommending applications in a network device according to an embodiment of a further aspect of the present disclosure.

FIG. 3 illustrates a schematic diagram of an apparatus for recommending applications in a network device according to an embodiment in a further aspect of the present disclosure.

Wherein, the apparatus of the present embodiment may be mainly implemented through a network device. The network device may include, but is not limited to, a single network server, a server consisting of a plurality of network servers, or a cloud consisting of mass computers or network servers based on cloud computing. Wherein the cloud computing is a kind of distributed computing, which may be a super virtual computer consisting of a group of loosely coupled computer sets.

It should be noted that the network device is only an example. Other existing or future possibly emerging network, if applicable to the present disclosure, should also be included within the protection scope of the present disclosure and is also incorporated here by reference.

The apparatus for recommending applications in the network device may comprise means (hereinafter referred to as first obtaining means 31) for obtaining a user's current scenario information from a user equipment, and means (hereinafter referred to as first determining means 32) for determining to-be-recommended applications according to the user's current scenario information and historical application usage information of one or more users; and means (hereinafter referred to as first sending means 33) for sending relevant information of the to-be-recommended applications to the user equipment.

The first obtaining means 31 may obtain user's current scenario information from a user equipment. The user equipment may include, but is not limited to, a computer, a smart phone, a PDA, and the like. It should be noted that the user equipment is only an example; other existing or future possibly emerging user equipment, if applicable to the present disclosure, should also be included within the protection scope of the present disclosure, and is incorporated here by reference.

In one embodiment, the scenario information includes at least one of the following:
time;
a place; or
an occasion.

In the present disclosure, the occasion may refer to other conditions not limited to the time and place. For example, in the office, at the office hour, and the mobile phone being set to mute, such occasion may be regarded as an office occasion or a meeting occasion; while also in the office, at an off hour, and the mobile phone being not set to mute, such occasion may not be believed an office or meeting occasion. As another example, within a cinema, the mobile phone being set to mute, this may be regarded as an occasion of watching a film; while also in a cinema, the mobile phone being not set to mute, this occasion may not be regarded as an occasion of watching a film.

There may be a plurality of ways for the first obtaining means 31 to obtain the user's current scenario information from a user equipment. For example, the first obtaining means 31 may constantly and periodically communicate with the user equipment so as to obtain the user's current scenario information from the user equipment. As another example, the first obtaining means may also obtain the user's current scenario information from the user equipment after receiving a request sent by the user equipment regarding to the to-be-recommended applications. In one embodiment, the first obtaining means 31 may comprises means (hereinafter referred to as first receiving means 311) for receiving a message including the user's current scenario information from the user equipment, and means (hereinafter referred to as second obtaining means 312) for obtaining the user's current scenario information based on the message including the user's current scenario information. Specifically, the user equipment sends a message including the current scenario information to the network device; the first receiving means 311 of the network device, after receiving the message, may extract the user's current scenario information from the message, thereby obtaining the user's current scenario information.

It should be noted that the above example is only for better illustrating the technical solution of the present disclosure, rather than limiting the present disclosure. Those skilled in the art should understand that any implementation manner of obtaining the user's current scenario information from the user equipment should be included within the scope of the present disclosure.

The first determining means 32 may determine the to-be-recommended applications according to the user's current scenario information and historical application usage information of one or more users.

The historical application usage information may refer to information about the user's previous use of an application. The historical application usage information may include at least one of the following:
time of use;
a place of use;
an occasion of use; or a frequency of use.

Here, the frequency of use may refer to the number of times of the user's using the application within a unit period of time.

In the context of the present disclosure, the applications may refer to various kinds of applications used in a user equipment, e.g., Baidu search, Baidu map, Taobao, Meituan, WeChat, browser, or other applications.

In one embodiment, the apparatus for recommending applications in a network device further may comprise means (hereinafter referred to as third obtaining means 34) for obtaining scenario information and application usage information of one or more users, and means (hereinafter referred to first establishing means 35) for establishing historical application usage information of the one or more users based on the scenario information and application usage information of the one or more users. The third obtaining means 34 may obtain scenario information and application usage information of one or more users. There are also a plurality of ways for the third obtaining means 34 to obtain the user's scenario information and application usage information. For example, the user equipment may temporarily store, in the user equipment, the user's application usage information such as the time, place, and occasion of each time when the user uses the application, and the frequency of the user using the application. The third obtaining means 34 may also send such application usage information to the third obtaining means 34 at a fixed time of each day. As another example, the third obtaining means 34 may periodically (e.g., every day) issue a request for sending the application usage information to the user equipment. After receiving the request for sending the application usage information from the third obtaining means 34, the user equipment may send local user application usage information to the third obtaining means 34. Those skilled in the art should understand that relevant depiction regarding obtaining scenario information of one or more users and application usage information is only exemplary, not limitative here, and various other implementation manners exist without departing from the spirit or scope of the present disclosure and are incorporated here by reference.

The first establishing means 35 may establish the historical application usage information of one or more users based on the scenario information and the application usage information of one or more users. Specifically, the first establishing means 35 may correspondingly analyze and process such information based on the obtained scenario information and the application usage information of one or more users. The processed information may be stored as the historical application usage information of the user. For example, the first establishing means 35 may count and analyze the situations of the one or more users using the application in a specific scenario. For example, the first establishing means 35 may derive through counting and analyzing that applications more commonly used by the one or more users in the meeting scenario are shorthand applications and recording applications. As another example, the first establishing means 35 derives through counting and analyzing that in a party scenario, 70% of the one or more users may use a WeChat application. The first establishing means 35 may also categorize the historical application usage information based on kinds of applications, such that application usage information of the same kind may be merged and saved together. For example, Netease news and Baidu news belong to the same kind of applications, and application usage information regarding the user's using the Netease news and Baidu news may be merged and saved together. In one embodiment, the first establishing means 35 may also establish a user historical application usage information database so as to save the historical application usage information of the one or more users derived from the analysis. It should be noted that the above example is only for better illustrating the technical solution of the present disclosure, not limiting the present disclosure. Those skilled in the art should understand that any implementation manner of establishing historical application usage information of one or more users based on the scenario information and application usage information of one or more users should be included within the scope of the present disclosure.

Specifically, the first determining means 32 may determine one or more to-be-recommended applications to be recommended to the user based on the derived current scenario information such as the current time, place and occasion of the user and the historical application usage information of the one or more users. For example, the first obtaining means 31 may first obtain the user's current scenario information: the user is currently in a cinema, the time is weekend relaxing time, and the first establishing means 35 may know that most users in cinemas at weekends use group-buying applications and payment applications like Nuomi and Alipay based on the information regarding applications used by a plurality of users in cinemas as recorded in the historical application usage information. The first determining means 32 may match the current scenario information of the user with scenarios of respective users' application usage in the historical application usage information, obtaining match values of respective applications. Because the match values of applications like Nuomi and Alipay are larger than a threshold value, the first determining means 32 may determine that the to-be-recommended applications are group-buying applications and payment applications like Nuomi and Alipay. As another example, the first determining means 32 may know, based on the historical application usage information, that 70% of users may use social applications like WeChat when taking a subway, and then may determine that social applications such as WeChat have a weight of 0.7 for a scenario of off duty and on the subway; the first establishing means 35 may know, based on the historical application usage information, that 50% users may use news applications when taking a subway, and may determine that the news applications like Netease have a weight of 0.5 for a scenario of off duty and on the subway. When the user's current scenario information is off duty and on the subway, the first determining means 32 may perform matching based on the scenario information and the historical application usage information to calculate out that the sorting value of WeChat-kind applications is 0.7, and the sorting value of the Netease news-kind applications is 0.5. The first determining means 32 may calculate out sorting values of various other kinds of applications in a similar manner, compare the sorting values of respective applications with a preset threshold value, and then may determine applications greater than the threshold value as the to-be-recommended applications. It should be noted that the above examples are only for better illustrating the technical solution of the present disclosure, not limiting the present disclosure. Those skilled in the art should understand that any implementation manner of determining to-be-recommended applications based on the current scenario information of the user and historical application usage information of one or more users should be included within the scope of the present disclosure.

The first sending means 33 may send relevant information of the to-be-recommended applications to the user equipment.

Wherein, the relevant information of the to-be-recommended applications may include any information related to the to-be-recommended applications. In one embodiment, the relevant information of the to-be-recommended applications can be used for obtaining or directly starting their corresponding to-be-recommended applications. For example, the relevant information of a to-be-recommended application includes, but is not limited to, any one or more of the following: 1) application name of the application, e.g., "Baidu Cloud," "Alipay," and the like; 2) unique identification of the application, wherein the unique identification information can uniquely identify the application, including, but not limited to: an application packet name of the application, a version number, picture information that may uniquely identify the application, and the like; 3) recommendation value of the application, wherein the recommendation value may indicate a recommended sorting and recommended strength degree of the application; 4) category of the application, e.g., the Netease news is of a news-kind application, Nuomi is of a group-buying-kind application, and WeChat is of a social-kind application. It should be noted that the application information above is only an example, and those skilled in the art should understand any information related to the application should be included within the scope of application information in the present disclosure.

Specifically, the first sending means 33 may send the relevant information of the recommended applications to the user equipment in a plurality of manners. The first sending means 33 may periodically voluntarily send relevant information of the to-be-recommended applications to the user equipment. The first sending means 33 may also first issue, to the user equipment, a request for sending the to-be-recommended applications. After receiving a request-acknowledged message from the user equipment, the first sending means 33 may send the relevant information of the to-be-recommended applications to the user equipment. In one embodiment, the first sending means 33 may comprise means (hereinafter referred to as second receiving means 331) for receiving the request about the to-be-recommended applications from the user equipment and means (hereinafter referred to as second sending means 332) for sending the relevant information of the to-be-recommended applications to the user equipment based on the request. For example, when the user is unlocking the user equipment, the user equipment may voluntarily issue a request to the network device to request the network device to send the to-be-recommended applications. After the second receiving means 331 receives the request, the second sending means 332 may send relevant information such as the application name of the to-be-recommended application of the user, the unique identifier of the application, the recommendation value of the application, or the kind of the application, based on the user information included in the request, such as the user identifier and the like.

Figure 4:
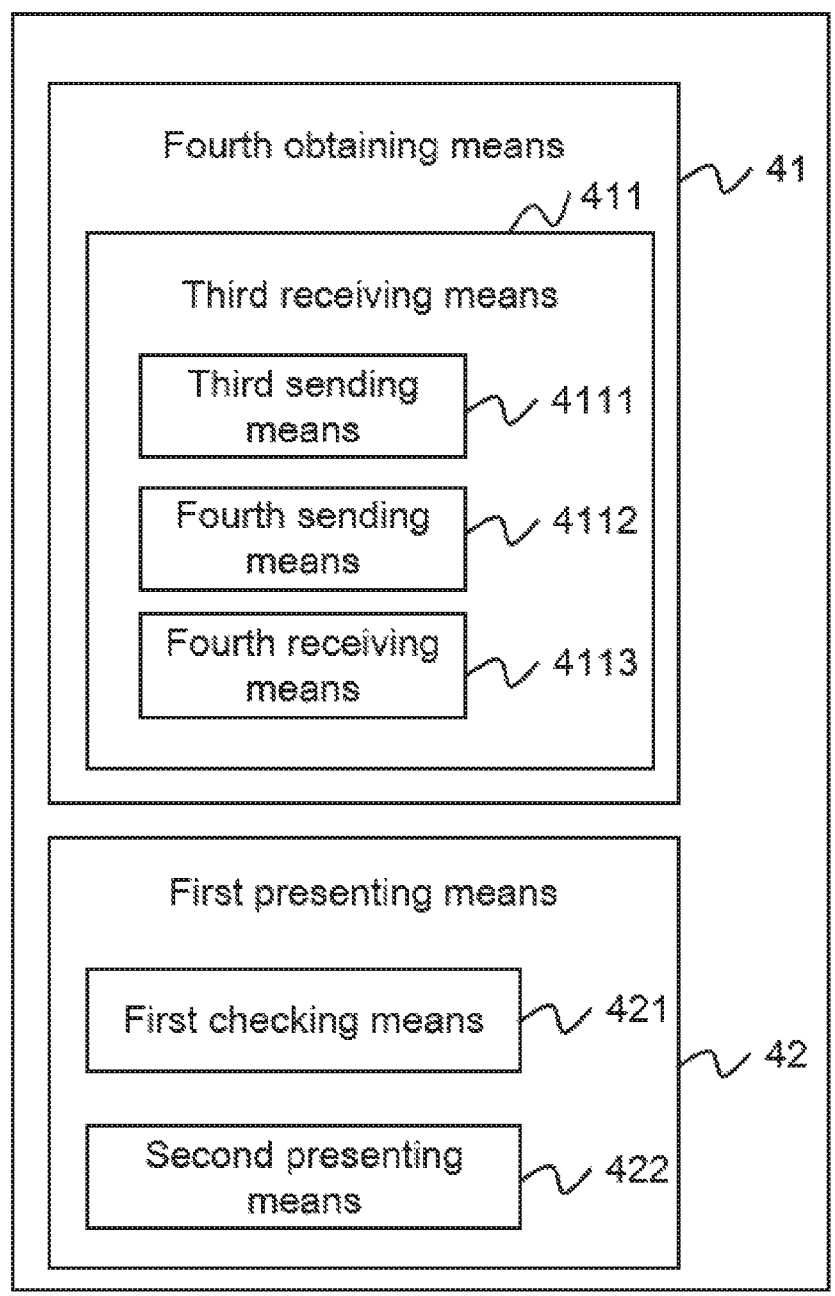
FIG. 4 illustrates a schematic diagram of an apparatus for presenting recommended applications in a user equipment according to an embodiment of another aspect of the present disclosure.

FIG. 4 illustrates a schematic diagram of an apparatus for presenting recommended applications in a user equipment according to an embodiment in another aspect of the present disclosure.

Wherein, the apparatus according to the present embodiment may be mainly implemented through a user equipment. The user equipment may include, but is not limited to, a PC computer, a tablet computer, a smart phone, and a PDA, etc. It should be noted that the user equipment is only an example, and other existing or future possibly emerging network devices or user equipment, if applicable to the present disclosure, should also be included within the protection scope of the present disclosure and are incorporated here by reference.

The apparatus for presenting recommended applications in a user equipment, wherein the apparatus may comprise: means (hereinafter referred to fourth obtaining means 41) for obtaining relevant information of to-be-recommended applications based on the user's current scenario information; and means (hereinafter referred to first presenting means 42) for presenting the to-be-recommended applications to the user based on the relevant information of the to-be-recommended applications.

The fourth obtaining means 41 may obtain relevant information of to-be-recommended applications based on the user's current scenario information.

In one embodiment, the scenario information may comprise at least any one of the following:

time;

a place; or an occasion.

In the present disclosure, the occasion may refer to other conditions not limited to the time and place. For example, in the office, at the office hour, and the mobile phone being set to mute, such occasion may be regarded as an office occasion or a meeting occasion; while also in the office, at an off hour, and the mobile phone being not set to mute, such occasion may not be regarded as an office occasion or a meeting occasion. For another example, within a cinema, the mobile phone being set to mute, this may be regarded as an occasion of watching a film; while also in a cinema, the mobile phone being not set to mute, this occasion may not be regarded as an occasion of watching a film.

Wherein, the relevant information of the to-be-recommended applications may include any information related to the to-be-recommended applications. In one embodiment, the relevant information of the to-be-recommended applications can be used for obtaining or directly starting their corresponding to-be-recommended applications. For example, the relevant information of a to-be-recommended application may include, but is not limited to, any one or more of the following: 1) application name of the application, e.g., "Baidu Cloud," "Alipay," and the like; 2) unique identification of the application, wherein the unique identification information can uniquely identify the application, including, but not limited to: an application packet name of the application, version number, picture information that may uniquely identify the application, and the like; 3) recommendation value of the application, wherein the recommendation value indicates a recommended sorting and recommended strength degree of the application; 4) category of the application, e.g., the Netease news is of a news-kind application, Nuomi is of a group-buying-kind application, and WeChat is of a social-kind application. It should be noted that the application information above is only an example, and those skilled in the art should understand any information related to the application should be included within the scope of application information in the present disclosure.

In the present disclosure, the relevant information of the to-be-recommended applications obtained by the fourth obtaining means 41 may be based on the current scenario information of the user. The fourth obtaining means 41 may obtain the relevant information of a to-be-recommended application in a plurality of manners. In one embodiment, the fourth obtaining means 41 may determine the relevant information of the to-be-recommended application locally based on the user's current scenario information. For example, the fourth obtaining means 41 may compare with historical situations of the user's using respective applications based on the scenario information including, e.g., the current place of the user, current time, or current occasion. The fourth obtaining means may also determine applications relatively frequently used in the scenario as the to-be-recommended applications. The fourth obtaining means may determine the relevant information like the names and application categories of the to-be-recommended applications.

In one embodiment, the fourth obtaining means 41 may comprise means (hereinafter referred to as third receiving means 411) for receiving relevant information of the to-be-recommended applications sent by the network device based on the user's current scenario information. The relevant information of the to-be-recommended applications sent by the network device may be based on the user's current scenario information, which may be determined according to the method described above in conjunction with FIG. 1. In one embodiment, the third receiving means 411 may further comprise means (hereinafter shortly referred to as third sending means 4111) for sending, to the network device, a message including the user's current scenario information. The third sending means 4111 may first send, to the network device, a message including the current scenario information of the user. Then the third receiving means 411 may receive relevant information of the to-be-recommended applications sent by the network device based on the user's current scenario information. The third receiving means 411 may receive the relevant information of the to-be-recommended applications sent by the network device in a plurality of manners. For example, the third receiving means 411 may periodically receive the relevant information of the to-be-recommended applications from the network device. As another example, the third receiving means 411 may first receive a message from the network device which may require sending to-be-recommended applications, and then the third receiving means 411, after replying with an acknowledgement message, may receive the relevant information of the to-be-recommended applications sent by the network device. In another embodiment, the third receiving means 411 may comprise means (hereinafter referred to as fourth sending means 4112) for sending a request regarding the to-be-recommended applications to the network device, and means (hereinafter referred to as fourth receiving means 4113) for receiving the relevant information of the to-be-recommended applications sent by the network device based on the user's current scenario information. For example, when the user is unlocking the user equipment, the fourth sending means 4112 may send a message to the network device to request the network device to send to-be-recommended applications. Meanwhile, the third sending means 4111 may send the user's current scenario information to the network device. The network device may determine the to-be-recommended applications based on the user's current scenario information and the historical application usage information. Then the network device may send the relevant information of the to-be-recommended applications to the user equipment via a message. The fourth receiving means 4113 may obtain the relevant information of the to-be-recommended applications by receiving the message from the network device. It should be noted that the above example is only for better illustrating the technical solution of the present disclosure, not for limiting the present disclosure. Those skilled in the art should understand that any implementing manner of receiving the relevant information of the to-be-recommended applications sent by the network device based on the user's current scenario information should be included within the scope of the present disclosure.

The first presenting means 42 may present the to-be-recommended applications to the user based on the relevant information of the to-be-recommended applications.

The first presenting means 42 may present the to-be-recommended applications in a plurality of manners. For example, after receiving the relevant information of the to-be-recommended applications, the first presenting means 42 may directly push shortcuts carrying icons of the to-be-recommended applications to a specific location of the display of the first presenting means 42 to display. As another example, the first presenting means 42 may also periodically obtain the relevant information of the to-be-recommended applications and constantly present latest relevant information of the to-be-recommended applications to the user. As another example, the user may click onto a "to-be-recommended applications" button, and then the first presenting means 42 may display the icons and/or shortcuts of the to-be-recommended applications to the user. In one embodiment, when there are too many to-be-recommended applications, the first presenting means 42 may sort according to recommendation values in the information of the to-be-recommended applications and display in priority several applications with maximum recommendation values.

In one embodiment, the first presenting means 42 may comprise means (hereinafter referred to as first checking means 421) for checking whether the to-be-recommended applications have been installed on the user equipment based on the relevant information of the to-be-recommended applications, and means (hereinafter referred to as second presenting means 422) for presenting the to-be-recommended applications to the user based on a result of checking.

The first checking means 421 might not know which applications have been installed on the user equipment when recommending the applications, such that some of the applications recommended by the network device might have been installed, while some might not. Therefore, the first checking means 421 may check whether the to-be-recommended applications from the network device have been installed locally and identifies those to-be-recommended applications that have not been installed in the user equipment.

The second presenting means 422 may present the to-be-recommended applications to the user based on a result of checking. In one embodiment, the second presenting means 422 may filter applications that are not installed in the second presenting means 422 based on the result of checking and only present the installed applications. The second presenting means 422 may also present the to-be-recommended applications that are not installed locally while provide a shortcut entry for installing the to-be-recommended applications for the user to select. When filtering the applications that are not installed locally, the second presenting means 422 may also look up applications of the same kind based on the kind of the application so as to present them to the user. For example, the network device recommends the application WeChat to the user, while the user equipment does not install WeChat. The second presenting means 422 knows from relevant information of the to-be-recommended applications that the category of the application is of a social class; then it finds a social-class application QQ installed locally, and then may present the application QQ to the user.

It should be noted that the present disclosure may be implemented in software or a combination of software and hardware; for example, it may be implemented by a dedicated integrated circuit (ASIC), a general-purpose computer, or any other similar hardware device. In an embodiment, the software program of the present disclosure may be executed by a processor so as to implement the above steps or functions. Likewise, the software program of the present disclosure (including relevant data structure) may be stored in a computer readable recording medium, for example, a RAM memory, a magnetic or optical driver, or a floppy disk, and similar devices. Besides, some steps of functions of the present disclosure may be implemented by hardware, for example, a circuit cooperating with the processor to execute various functions or steps.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

Although exemplary embodiments have been specifically illustrated and described above, those skilled in the art will understand that without departing from the spirit and scope of the claims, their forms and details may change somewhat. Here, the protection as sought is defined in the appended claims. These and other aspects of respective embodiments are prescribed in the following numbered clauses:

1. A method for recommending applications in a network device, wherein the method comprises:
obtaining a user's current scenario information from a user equipment;
determining to-be-recommended applications according to the user's current scenario information and historical application usage information of one or more users; and
sending relevant information of the to-be-recommended applications to the user equipment.

2. The method according to clause 1, wherein the method further comprises:
obtaining scenario information and application usage information of the one or more users; and
establishing the historical application usage information of the one or more users based on the scenario information and the application usage information of the one or more users.

3. The method according to clauses 1 or 2, wherein the obtaining a user's current scenario information from a user equipment comprises:
receiving a message including the user's current scenario information from the user equipment; and
obtaining the user's current scenario information based on the message including the user's current scenario information.

4. The method according to any one of clauses 1-3, wherein the sending relevant information of the to-be-recommended applications to the user equipment comprises:
receiving a request for the to-be-recommended applications from the user equipment; and
sending the relevant information of the to-be-recommended applications to the user equipment based on the request.

5. The method according to any one of clauses 1-4, wherein the scenario information comprises at least one of the following:
time;
a place; or
an occasion.

6. The method according to any one of clauses 1-5, wherein the historical application usage information comprises at least one of the following:
time of use;
a place of use;
an occasion of use; or
a frequency of use.

7. A method for presenting recommended applications in a user equipment, comprising:
obtaining relevant information of to-be-recommended applications based on a user's current scenario information; and
presenting the to-be-recommended applications to the user based on the relevant information of the to-be-recommended applications.

8. The method according to clause 7, wherein the obtaining relevant information of to-be-recommended applications based on a user's current scenario information comprises:
receiving the relevant information of the to-be-recommended applications sent by a network device based on the user's current scenario information.

9. The method according to clause 8, wherein the receiving the relevant information of the to-be-recommended applications sent by a network device based on the user's current scenario information further comprises:
sending a message including the user's current scenario information to the network device.

10. The method according to clause 8 or 9, wherein the receiving the relevant information of the to-be-recommended applications sent by a network device based on the user's current scenario information comprises:
sending a request for the to-be-recommended applications to the network device; and
receiving the relevant information of the to-be-recommended applications sent by the network device based on the user's current scenario information.

11. The method according to any one of clauses 7-10, wherein the presenting the to-be-recommended applications to the user based on the relevant information of the to-be-recommended applications comprises:
checking whether the to-be-recommended applications have been installed on the user equipment based on the relevant information of the to-be-recommended applications to generate a checking result; and
presenting the to-be-recommended applications to the user based on the checking result.

12. The method according to any one of clauses 7-11, wherein the scenario information comprises at least any one of the following:
time;
a place; or
an occasion 13. An apparatus for recommending applications in a network device, wherein the apparatus comprises:
   means for obtaining a user's current scenario information from a user equipment;
   means for determining to-be-recommended applications according to the user's current scenario information and historical application usage information of one or more users; and
   means for sending relevant information of the to-be-recommended applications to the user equipment.

14. The apparatus according to clause 13, wherein the apparatus further comprises:
   means for obtaining scenario information and application usage information of the one or more users; and
   means for establishing the historical application usage information of the one or more users based on the scenario information and the application usage information of one or more users.

15. The apparatus according to clause 13 or 14, wherein the means for obtaining a user's current scenario information from a user equipment comprises:
   means for receiving a message including the user's current scenario information from the user equipment; and
   means for obtaining the user's current scenario information based on the message including the user's current scenario information.

16. The apparatus according to any one of clauses 13-15, wherein the means for sending relevant information of the to-be-recommended applications to the user equipment comprises:
   means for receiving a request for the to-be-recommended applications from the user equipment; and
   means for sending the relevant information of the to-be-recommended applications to the user equipment based on the request.

17. The apparatus according to any one of clauses 13-16, wherein the scenario information comprises at least one of the following:
   time;
   a place; or
   an occasion.

18. The apparatus according to any one of clauses 13-17, wherein the historical application usage information comprises at least one of the following:
   time of use;
   a place of use;
   an occasion of use; or
   a frequency of use.

19. An apparatus for presenting recommended applications in a user equipment, comprising:
   means for obtaining relevant information of to-be-recommended applications based on a user's current scenario information; and
   means for presenting the to-be-recommended applications to the user based on the relevant information of the to-be-recommended applications.

20. The apparatus according to clause 19, wherein the means for obtaining relevant information of to-be-recommended applications based on a user's current scenario information comprises:
   means for receiving the relevant information of the to-be-recommended applications sent by a network device based on the user's current scenario information.

21. The apparatus according to clause 20, wherein the means for receiving the relevant information of the to-be-recommended applications sent by a network device based on the user's current scenario information further comprises:
   means for sending a message including the user's current scenario information to the network device.

22. The apparatus according to clause 20 or 21, wherein the means for receiving the relevant information of the to-be-recommended applications sent by a network device based on the user's current scenario information comprises:
   means for sending a request for the to-be-recommended applications to the network device; and
   means for receiving the relevant information of the to-be-recommended applications sent by the network device based on the user's current scenario information.

23. The apparatus according to any one of clauses 19-22, wherein the means for presenting the to-be-recommended applications to the user based on the relevant information of the to-be-recommended applications comprises:
   means for checking whether the to-be-recommended applications have been installed on the user equipment based on the relevant information of the to-be-recommended applications to generate a checking result; and
   means for presenting the to-be-recommended applications to the user based on a checking result.

24. The apparatus according to any one of clauses 19-23, wherein the scenario information includes at least any one of the following:
   time;
   a place; or
   an occasion 25. A computer readable non-volatile storage, configured to store computer program, when the computer program is executed by a computer, the computer is directed to:
   obtain a user's current scenario information from a user equipment;
   determine to-be-recommended applications according to the user's current scenario information and historical application usage information of one or more users; and
   send relevant information of the to-be-recommended applications to the user equipment.

26. A computer device, comprising:
   at least one processor; and
   a memory, configured to store computer program, when the computer program is executed by the at least one processor, the processor is directed to:
   obtain a user's current scenario information from a user equipment;
   determine to-be-recommended applications according to the user's current scenario information and historical application usage information of one or more users; and
   send relevant information of the to-be-recommended applications to the user equipment.

27. The computer device according to clause 26, wherein the processor is further directed to:
   obtain scenario information and application usage information of the one or more users; and
   establish the historical application usage information of the one or more users based on the scenario information and the application usage information of the one or more users.

28. The computer device according to clause 26, wherein to obtain a user's current scenario information from a user equipment, the processor is directed to:
   receive a message including the user's current scenario information from the user equipment; and
   obtain the user's current scenario information based on the message including the user's current scenario information from the user equipment.

What is claimed is:
1. A method for recommending applications in a network device, comprising:

obtaining a user's current scenario information from a user equipment, the user's current scenario information comprising at least one of an occasion, time or a place;

determining to-be-recommended applications according to the user's current scenario information and historical application usage information of a plurality of users; and sending relevant information of the to-be-recommended applications to the user equipment, wherein the user's historical application usage information is information about the user's previous use of an application and comprises at least one of:

time of historical use of the application;

a place of historical use of the application;

an occasion of historical use of the application; or a frequency of using the application.

2. The method according to claim 1, wherein the method further comprises:

obtaining scenario information and application usage information of the plurality of users; and establishing the historical application usage information of the plurality of users based on the scenario information and application usage information of the plurality of users.

3. The method according to claim 1, wherein the obtaining a user's current scenario information from a user equipment comprises:

receiving a message including the user's current scenario information from the user equipment; and obtaining the user's current scenario information based on the message including the user's current scenario information from the user equipment.

4. The method according to claim 1, wherein the sending relevant information of the to-be-recommended applications to the user equipment comprises:

receiving a request for the to-be-recommended applications from the user equipment; and sending the relevant information of the to-be-recommended applications to the user equipment based on the request.

5. A method for presenting recommended applications in a user equipment, comprising:

obtaining relevant information of to-be-recommended applications based on a user's current scenario information, the user's current scenario information comprising at least one of an occasion, time and a place; and presenting the to-be-recommended applications to the user based on the relevant information of the to-be-recommended applications, wherein the relevant information of a to-be-recommended application comprises:

name of the to-be-recommended application;

unique identification of the to-be-recommended application;

recommendation value of the application; or category of the application, wherein the presenting the to-be-recommended applications to the user based on the relevant information of the to-be-recommended applications comprises:

checking whether the to-be-recommended applications have been installed on the user equipment based on the relevant information of the to-be-recommended applications to generate a checking result; and presenting the to-be-recommended applications to the user based on the checking result.

6. The method according to claim 5, wherein the obtaining relevant information of to-be-recommended applications based on a user's current scenario information comprises:

receiving the relevant information of the to-be-recommended applications sent by a network device based on the user's current scenario information.

7. The method according to claim 6, wherein the receiving the relevant information of the to-be-recommended applications sent by a network device based on the user's current scenario information further comprises:

sending a message including the user's current scenario information to the network device.

8. The method according to claim 6, wherein the receiving the relevant information of the to-be-recommended applications sent by a network device based on the user's current scenario information comprises:

sending a request for the to-be-recommended applications to the network device; and receiving the relevant information of the to-be-recommended applications sent by the network device based on the user's current scenario information.

9. A computer readable non-transitory storage, configured to store computer program, when the computer program is executed by a computer, the computer is directed to:

obtain a user's current scenario information from a user equipment, the user's current scenario information comprising at least one of an occasion, time and a place;

determine to-be-recommended applications according to the user's current scenario information and historical application usage information of a plurality of users; and send relevant information of the to-be-recommended applications to the user equipment, wherein the user's historical application usage information is information about the user's previous use of an application and comprises at least one of:

time of historical use of the application;

a place of historical use of the application;

an occasion of historical use of the application; or a frequency of using the application.

10. A computer device, comprising:

at least one processor; and a memory, configured to store computer program, when the computer program is executed by the at least one processor, the processor is directed to:

obtain a user's current scenario information from a user equipment, the user's current scenario information comprising at least one of an occasion, time and a place;

determine to-be-recommended applications according to the user's current scenario information and historical application usage information of a plurality of users; and send relevant information of the to-be-recommended applications to the user equipment, wherein the user's historical application usage information is information about the user's previous use of an application and comprises at least one of:

time of historical use of the application;

a place of historical use of the application;

an occasion of historical use of the application; or a frequency of using the application.

11. The computer device according to claim 10, wherein the processor is further directed to:

obtain scenario information and application usage information of the plurality of users; and establish historical application usage information of the plurality of users based on the scenario information and application usage information of the plurality of users.

12. The computer device according to claim 10, wherein to obtain a user's current scenario information from a user equipment, the processor is directed to:
  receive a message including the user's current scenario information from the user equipment; and
  obtain the user's current scenario information based on the message including the user's current scenario information from the user equipment.

* * * * *